United States Patent [19]

Hasegawa

[11] Patent Number: 5,359,471
[45] Date of Patent: Oct. 25, 1994

[54] RECORDING AND/OR REPRODUCING APPARATUS USING ROTARY HEADS ACCORDING TO TRAVELLING SPEEDS OF A RECORDING MEDIUM

[75] Inventor: Masahide Hasegawa, Kanagawa, Japan

[73] Assignee: Canon Kabushiki Kaisha, Tokyo, Japan

[21] Appl. No.: 180,703

[22] Filed: Jan. 13, 1994

Related U.S. Application Data

[63] Continuation of Ser. No. 865,643, Apr. 30, 1992, abandoned, which is a continuation of Ser. No. 355,652, May 22, 1989, abandoned.

[30] Foreign Application Priority Data

May 25, 1988 [JP] Japan ................... 63-126009
May 25, 1988 [JP] Japan ................... 63-126010

[51] Int. Cl.[5] ................. G11B 15/14; G11B 15/46
[52] U.S. Cl. ........................... 360/64; 360/73.05
[58] Field of Search ............ 360/10.1, 10.3, 35.1, 360/64, 69, 70, 32, 73.04, 73.05; 358/312

[56] References Cited

U.S. PATENT DOCUMENTS

| | | | |
|---|---|---|---|
| 4,293,880 | 10/1981 | Tsukada et al. ............ | 360/70 |
| 4,491,878 | 1/1985 | Toba ........................... | 360/10.1 |
| 4,862,292 | 8/1989 | Enari et al. ................. | 360/32 |
| 4,897,739 | 1/1990 | Hasegawa et al. .......... | 360/64 |
| 5,063,453 | 11/1991 | Yoshimura et al. ......... | 360/32 |

Primary Examiner—Donald Hajec
Assistant Examiner—Won Tae C. Kim
Attorney, Agent, or Firm—Robin, Blecker Daley & Driscoll

[57] ABSTRACT

In a rotary head type recording and/or reproducing apparatus having an n number (n: an integer at least 3) of rotary heads for recording or reproducing signals on or from a recording medium, when the recording medium is allowed to travel at a first speed, a signal is recorded or reproduced by using all the n number of rotary heads. When the recording medium is allowed to travel at a second speed which is lower than the first speed, a signal is recorded or reproduced by using only a predetermined m number (m: an integer at least 2 but not exceeding n) of adjacent heads. A distance on the recording medium between tracing positions of adjacent heads included in the predetermined m number of heads when the medium is traveling at the first speed differs from a distance on the recording medium between tracing positions of other adjacent heads included in the n number of rotary heads.

18 Claims, 7 Drawing Sheets

RECORDING AND/OR REPRODUCING APPARATUS USING ROTARY HEADS ACCORDING TO TRAVELLING SPEEDS OF A RECORDING MEDIUM

This is a continuation under 37 CFR 1.62 of prior application Ser. No. 865,643, filed Apr. 30, 1992 (now abandoned), which is a continuation of Ser. No. 355,652 filed May 22, 1989 (now abandoned)

BACKGROUND OF THE INVENTION

1. Field of the Invention

This invention relates to a rotary head type recording and/or reproducing apparatus and more particularly to an apparatus arranged to record and/or reproduce signals with a plurality of adjacently disposed heads on or from a recording medium and to permit selection of any of a plurality of recording medium transporting speeds.

2. Description of the Related Art

It has been known that a recording and/or reproducing apparatus of the kind handling digital signals of a high bit rate, such as video signals, must have a plurality of heads arranged on a rotary drum to be simultaneously in contact with a recording tape (medium) for the purpose of reducing the bit rate per channel by allotting the signal to a plurality of channels.

Figure 1:
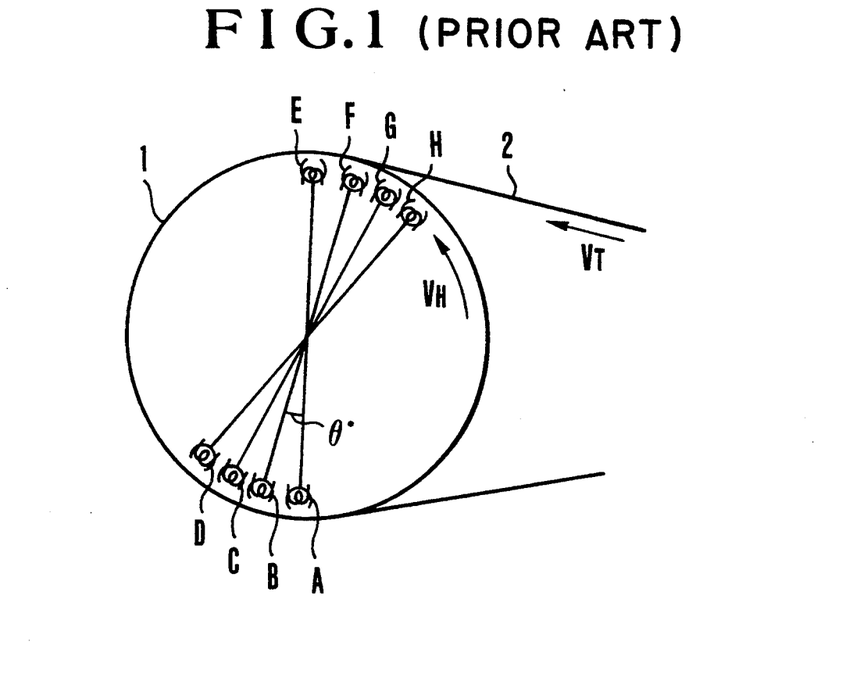
FIG. 1 shows the allocation of the rotary heads of an apparatus which is capable of recording or reproducing signals in or from four channels.
Figure 2:
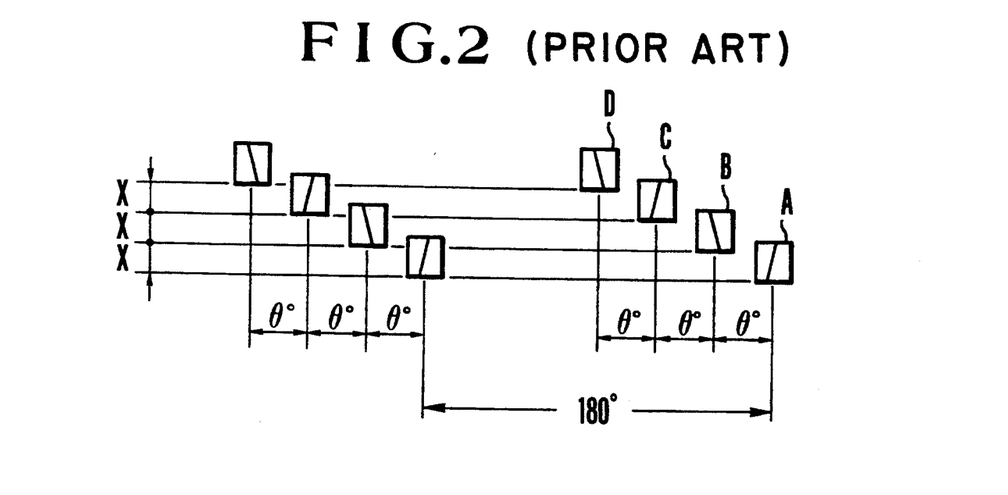
FIG. 2 is a side development view showing the allocation of the rotary heads of FIG. 1.
Figure 3:
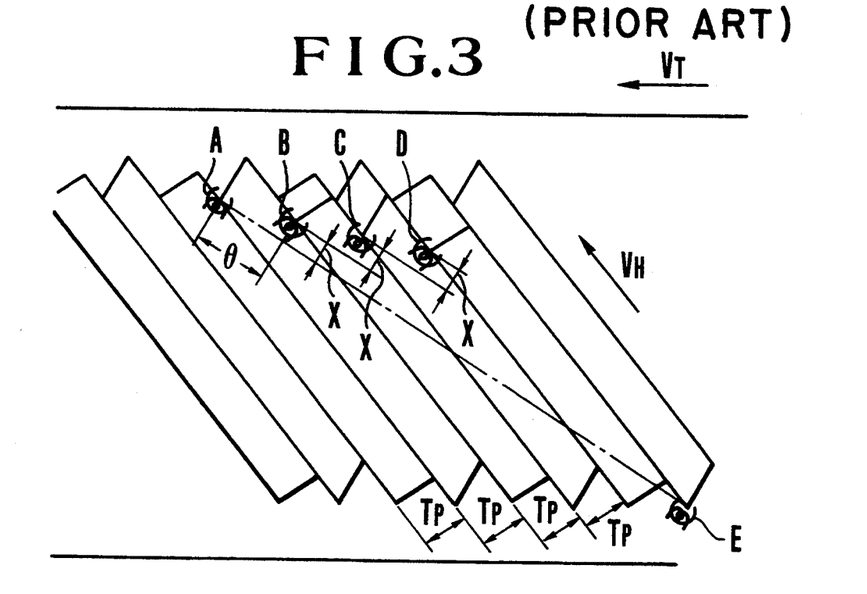
FIG. 3 shows a recording pattern obtained on a magnetic tape when four-channel recording is performed with the rotary heads shown in FIGS. 1 and 2.

FIGS. 1 to 3 of the accompanying drawings show an arrangement for allotting the signal to four channels. Of these figures, FIGS. 1 and 2 show the allocation of the rotary heads in a top plan view and a side development view. In these figures, a reference numeral 1 denotes a rotary drum; a numeral 2 denotes a magnetic tape; and symbols A to H denote the heads respectively. As shown, the heads A to H are mounted on the periphery of the drum 1, with four heads spaced at a degree $\Theta$ and positioned stepwise at a stepped difference X on each of two opposite sides of the drum circumference. The heads come into contact with the magnetic tape 2 one by one accordingly as the drum 1 rotates. However, since at least four of them are simultaneously in contact with the tape 2, the signal can be recorded or reproduced in or from four channels.

When the magnetic tape 2 is conveyed at a given speed $V_T$ under this condition, a track pattern is formed with equal track pitches $T_P$ as shown in FIG. 3. A high degree of recording density is attained with the necessity of guard bands obviated by setting azimuth angles of $+\alpha°$ and $-\alpha°$ for adjacent heads in such a way as to utilize an azimuth loss.

Meanwhile, there is a desire for altering the bit rate of the digital signal to be recorded and reproduced. In the case of a video signal, the bandwidth of the signal can be compressed by various known methods. The amount of data is reducible without much deteriorating picture quality. This permits continuous recording or reproduction over a long period.

To meet this requirement with the arrangement described, therefore, it is conceivable to alter the bit rate for increasing the recording time by setting the tape speed at a ½ speed and by recording a signal simultaneously in two channels.

Figure 4:
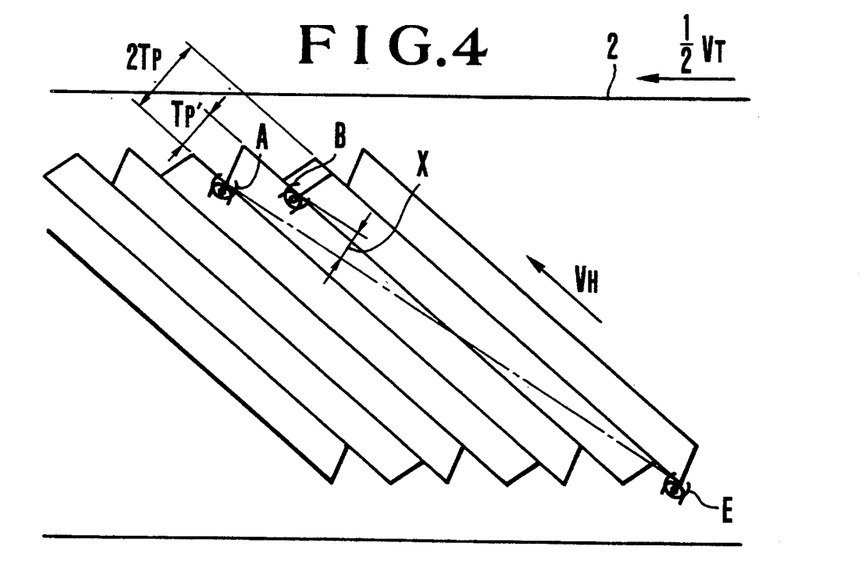
FIG. 4 shows a recording pattern obtained on the tape when two-channel recording is performed with the rotary heads shown in FIGS. 1 and 2.

However, in a case where the four heads A, B, E and F are used, the track pattern becomes as shown in FIG. 4 (with the spacing angle $\Theta$ set at 13.5 degrees) and it is impossible to uniformly have the track pitches.

Figure 5:
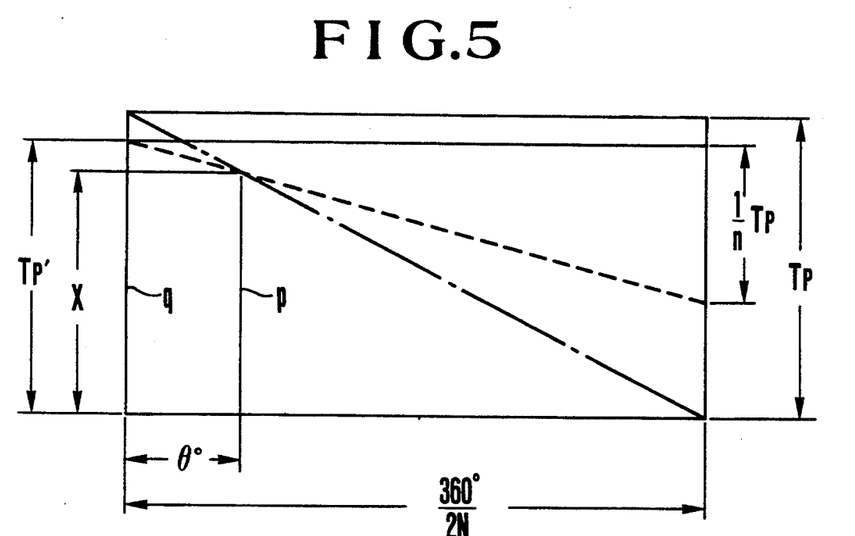
FIG. 5 shows track pitches obtained at different tape speeds with the rotary heads shown in FIGS. 1 and 2.

Assuming that the total number of heads is 2N, a track pitch obtained at a tape speed $V_T$ is $T_P$, a track pitch $T_{P'}$ obtained at a tape speed $1/n\ V_T$ with two heads spaced at the angle $\Theta$ and at a stepped difference X in position becomes as expressed below (see FIG. 5):

$$T_{P'} = T_P\left(1 - \frac{N\theta°}{180°} + \frac{N\theta°}{n \times 180°}\right)$$

Referring to FIG. 5, an oblique one-dot chain line represents a head locus obtained at the tape speed $V_T$ and a broken line represents another head locus obtained at the tape speed $1/n\ V_T$. An intersection point between a vertical line p and these lines indicates the stepped difference X between the heads. Intersection points between another vertical line q and these lines indicate the actual track pitches $T_P$ and $T_{P'}$. In other words, the track pitch decreases by a degree as expressed below:

$$T_P - T_{P'} = \left(1 - \frac{1}{n} \times \right)\frac{N\theta°}{180°} T_P$$

This causes a decrease in output and results in deterioration in S/N ratio. Especially, in the case of recording a digital signal, this presents a serious problem, because: It is known that the deterioration of S/N ratio by 1 dB increases the rate of data errors by about ten times.

Further, an attempt to secure a desired S/N ratio at the narrow track pitch $T_{P'}$, would result in wasteful use of the tape because the average track pitch is $T_P$. In other words, the rate of the wasteful tape use would be $T_P/T_{P'}$ times as much as the normal use (1.15 times in the above example). This means a decrease in recording density.

SUMMARY OF THE INVENTION

This invention is directed to the solution of the above-stated problems of the prior art.

It is, therefore, an object of the invention to provide a rotary head type recording and/or reproducing apparatus which is capable of minimizing the amount of a recording medium to be used without causing deterioration in the S/N ratio of a reproduced signal.

Under this object, a rotary head type recording and/or reproducing apparatus arranged according to this invention in one mode of embodiment thereof comprises: an n number of rotary heads arranged to trace a recording medium; transport means for transporting the recording medium; and mode selection means for selecting one of a first mode in which all the n number of rotary heads are used for recording and/or reproducing a signal and a second mode in which only a predetermined m number of rotary heads adjacently disposed among the n number of rotary heads are used for recording and/or reproducing a signal. The transport means is arranged to transport the recording medium at a first speed in the first mode and at a second speed which is lower than the first speed in the second mode. In the first mode, a distance on the recording medium between tracing positions of adjacent heads included in the predetermined m number of rotary heads differs from a distance on the recording medium between tracing positions of other adjacent heads included in the n number of rotary heads.

Further a rotary head type recording and/or reproducing apparatus which is arranged according to the invention in another mode of embodiment comprises: an n number of rotary heads arranged to trace a recording medium; transport means for transporting the recording medium in a direction which meets at an acute angle a direction in which the n number of rotary heads traces the recording medium; and mode selection means for selecting one of a first mode in which all the n number of rotary heads are used for recording and/or reproducing a signal and a second mode in which only a predetermined m number of rotary heads adjacently disposed among the n number of rotary heads are used for recording and/or reproducing a signal. The transport means is arranged to transport the recording medium at a first speed in the first mode and at a second speed in the second mode. The first speed is arranged to be higher than n/m of the second speed.

The above and other objects and features of the invention will become apparent from the following detailed description of embodiments thereof taken in connection with the accompanying drawings.

DETAILED DESCRIPTION OF THE PREFERRED EMBODIMENTS

Figure 6:
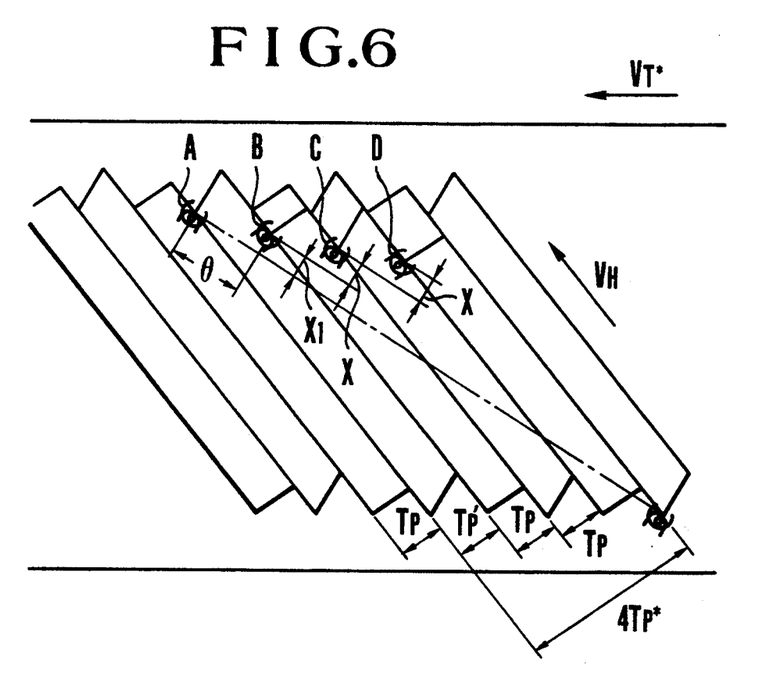
FIG. 6 shows a recording pattern obtained on a tape when recording is performed in a first (or normal) mode by a digital VTR which is arranged according to this invention as a first embodiment thereof.
Figure 7:
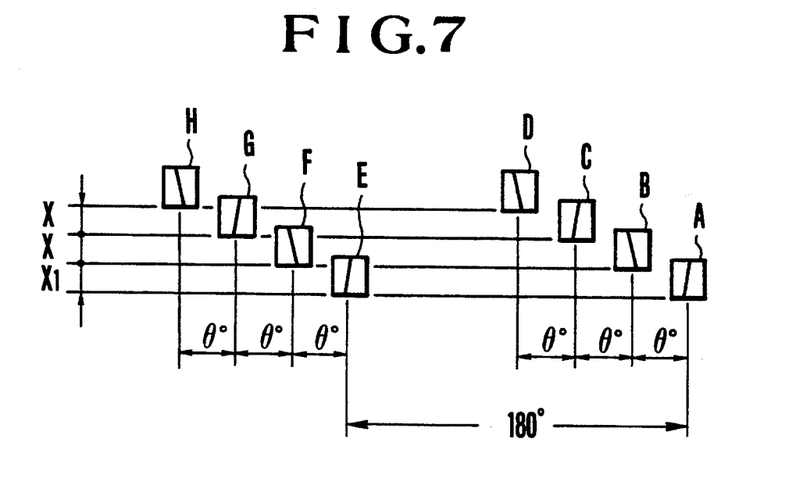
FIG. 7 is a side development view showing the allocation of rotary heads of the same digital VTR.
Figure 8:
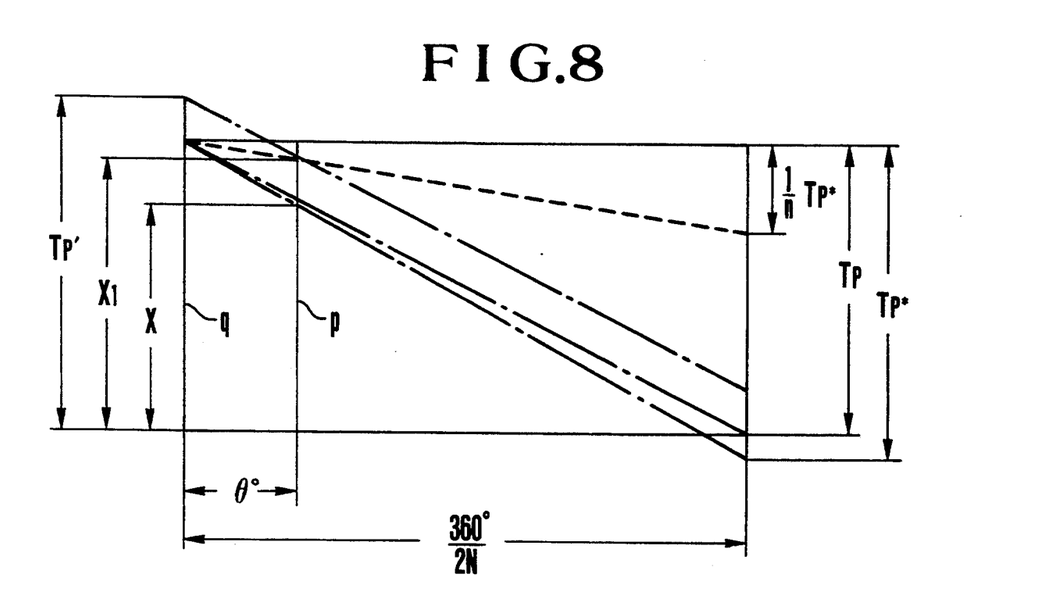
FIG. 8 shows track pitches obtained by using the same digital VTR.
Figure 9:
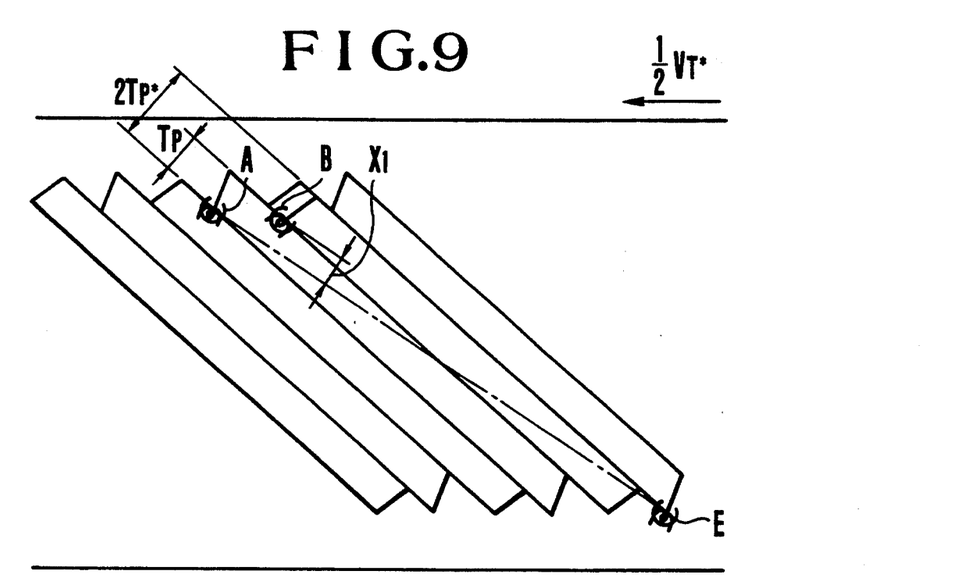
FIG. 9 shows a recording pattern obtained on the tape in a second mode (or long play mode) by the same digital VTR.

The details of this invention will be understood from the following description of embodiments thereof:

FIGS. 6 to 9 show a digital video tape recorder (DVTR for short) which is arranged according to the invention as a first embodiment thereof, Among these figures, FIG. 6 shows a track pattern obtained on a tape at a tape speed $V_T^*$ (in a normal mode), FIG. 7 is a side development view of a rotary drum employed in the DVTR of this embodiment, FIG. 8 shows a track pitch resulting from a stepped difference in position between heads (in the direction of rotation axis), FIG. 9 shows a track pattern obtained at a tape speed $\frac{1}{2} V_T^*$ (in a long play mode), The top plan view of the rotary drum is the same as the conventional drum which is arranged as shown in FIG. 1.

Referring to FIG. 7, the stepped position difference is set at a value $X_1$ between heads A and B and between E and F only and is set at a value X between other heads, These stepped position difference values $X_1$ and X are arranged to give a track pitch $T_P$ when the tape is transported at speeds $1/n\ V_T^*$ (n=2 in this case) and $V_T^*$ as shown in FIG. 8 Further the tape speed $V_T^*$ is somewhat higher than the tape speed $V_T$ which is obtained when an average track pitch is $T_P$ and the speed $V_T^*$ is obtained when the average track pitch is $T_P^*$.

With the rotary heads arranged in this manner, when the tape is transported at the speed $V_T^*$ in the normal (or first) mode, a track pattern is obtained as shown in FIG. 6. In other words, tracks drawn by the heads A and E which are to be used also in the long play mode (or the second mode) alone have a pitch $T_{P'}$ while tracks drawn by other heads have the pitch $T_P$.

Referring to FIG. 8, the stepped position difference $X_1$ and the track pitch $T_{P'}$ can be expressed as:

$$X_1 = T_P - \frac{1}{n} T_P^* \times \frac{N\theta°}{180°} \quad (1)$$

$$T_{P'} = X_1 + T_P^* \times \frac{N\theta}{180°} \quad (2)$$

$$= T_P + \left(1 - \frac{1}{n}\right) T_P^* \times \frac{N\theta°}{180°} \quad (3)$$

Meanwhile since the pitch $T_P^*$ is an average track pitch, there obtains the following relation:

$$4T_P^* = T_{P'} + 3T_P \quad (4)$$

The value of the track pitch $T_P^*$ then can be obtained by eliminating $T_{P'}$ from the two formulas (3) and (4) shown above as expressed below:

$$T_P^* = \frac{4}{4 - (1 - 1/n) \times (N\theta°)/180°} T_P \quad (5)$$

Hence, there obtains the following relation:

$$\frac{V_T^*}{V_T} = \frac{T_P^*}{T_P} = \frac{4}{4 - (1 - 1/n) \times (N\theta°)/180°} \quad (6)$$

Assuming that N=4, n=2 and Θ=13.5° in the same manner as in the case of the conventional arrangement described in the foregoing, there obtains the following relation:

$$\frac{V_T^*}{V_T} = \frac{80}{77} \approx 1.039 \quad (7)$$

In the event of parallel recording in two channels with four heads A, B, E and F at a tape speed set at $\frac{1}{2} V_T^*$, a track pattern is obtained as shown in FIG. 9.

Then, since the heads A and E give the track pitch $T_P$ and the average track pitch is $T_P^*$, the heads B and F give a pitch of $(2\ T_P^* - T_P)$ (about 1.078 $T_P$ in the case of this embodiment).

In the case of the conventional arrangement described in the foregoing, the tape using amount increases by about 15% in obtaining the same minimum track pitch $T_P$. Whereas, it increases only about 3.9% in accordance with the arrangement of this embodiment.

Meanwhile, the arrangement of the first embodiment to have the average track pitch at $T_P^*$ for operation in the long play mode as shown in FIG. 9 cannot be regarded as completely wasteless. In view of this, a second embodiment of the invention is aimed at making the tape using amount completely wasteless by keeping the average track pitch at $T_P$ in the long play mode.

Figure 10:
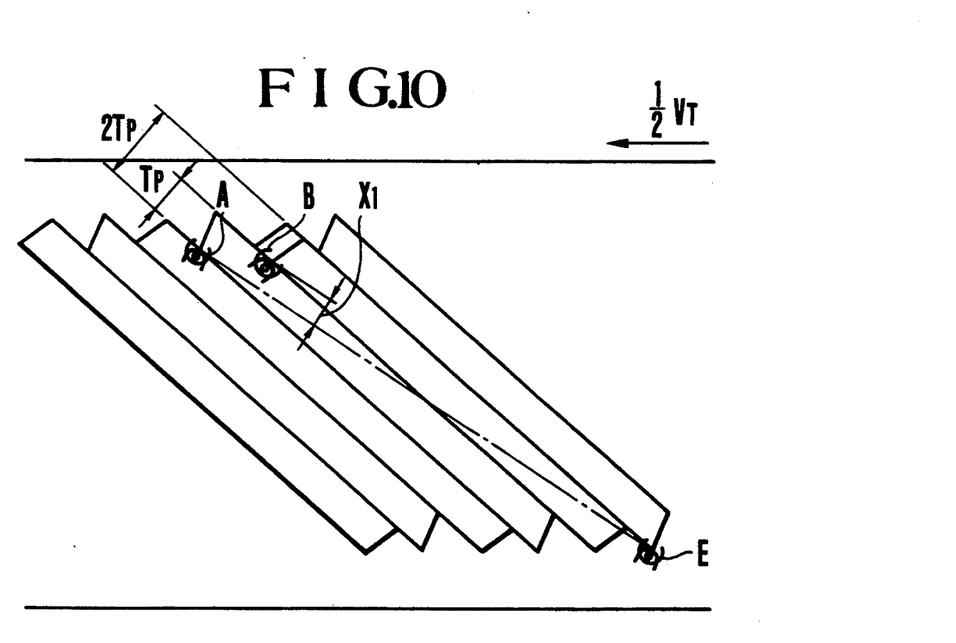
FIG. 10 shows a recording pattern obtained on a tape when recording is performed in a second (or long play) mode with a digital VTR which is arranged according to this invention as a second embodiment thereof.

The second embodiment is arranged as follows: In this case, the tape speed for the long play mode is set at $\frac{1}{2} V_T$. FIG. 10 shows a recording pattern formed in the long play mode by the DVTR of the second embodiment.

The allocation of the rotary heads of the second embodiment is the same as in the case of the first embodiment shown in FIG. 7, except that: The stepped position difference value $X_1$ between the heads A and B or between the heads E and F is changed to a value $X_1'$ which gives the track pitch $T_P$ when the tape is transported at a speed of $1/n\ V_T$ ($n=2$ in this case). The head allocation gives a track pattern uniformly having the track pitch $T_P$ at the tape speed $\frac{1}{2} V_T$ as shown in FIG. 10. The stepped position difference $X_1'$ can be obtained by replacing the value $1/n\ T_P^*$ of FIG. 8 with $1/n\ T_P$.

In the normal mode, in this case, as apparent from FIG. 8, the stepped position difference $X_1$ between the heads A and B and between the heads E and F would cause the track pitches of the heads A and E to become larger than the value $T_P$ if the tape is transported at the speed $V_T$. With the tape speed set at $V_T$ in that manner, the tracks of the heads A and E become wider while those of the heads D and H become narrower, because the average track pitch is $T_P$. To solve this problem, the average track pitch $T_P$ must be increased to a value $T_P^*$ by changing the tape speed to a speed $V_T^*$.

In this case, the value of $1/n\ T_P^*$ of FIG. 8 is $\frac{1}{2} T_P$. Therefore, the stepped position difference $X_1$ can be expressed, like Formula (1), as follows:

$$X_1 = T_P - \frac{1}{n} T_P \times \frac{N\theta°}{180°} \quad (8)$$

Further, like Formula (2), the track pitch $T_P'$ obtained by the heads A and E can be expressed as follows:

$$T_{P'} = X_1 + T_P^* \times \frac{N\theta°}{180°} \quad (9)$$

$$= \left(1 - \frac{1}{n} \times \frac{N\theta°}{180°}\right) T_P + T_P^* \frac{N\theta°}{180°} \quad (10)$$

Further, since $4\ T_P^* = T_{P'} + 3\ T_P$—(11), there obtains the following relation:

$$4\ T_P^* - 3\ T_P = \left(1 - \frac{1}{n} \times \frac{N\theta°}{180°}\right) T_P + \frac{N\theta°}{180°} T_P^* \quad (12)$$

-continued $$T_P^* = \frac{4n \times 180 - N\theta}{n(4 \times 180 - N\theta)} T_P \quad (13)$$

Assuming that N is 4, n is 2 and $\Theta°$ is 13.5°, there obtains the following relation:

$$\frac{V_T^*}{V_T} = \frac{T_P^*}{T_P} = \frac{77}{44} = 1.0405 \quad (14)$$

Therefore, the digital VTR arranged as the second embodiment of the invention has the tape using amount in the long play mode remain the same as in the case of the conventional VTR. Meanwhile, the tape using amount in the normal mode increases by 1.0405 times.

Figure 11:
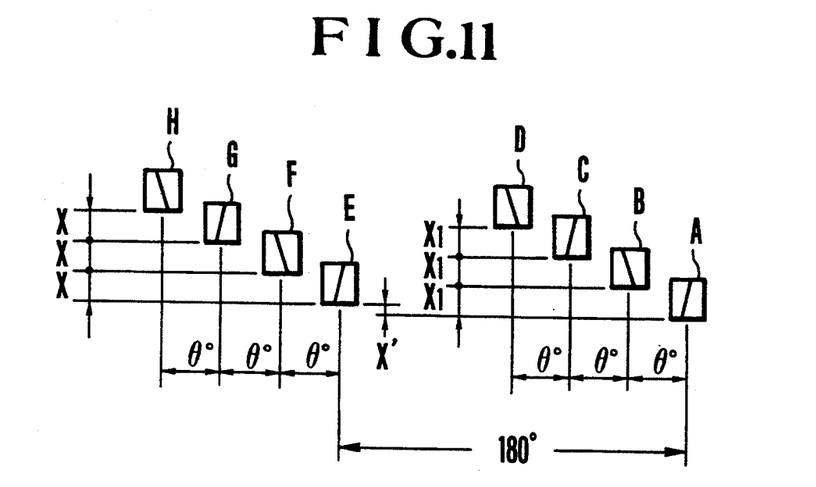
FIG. 11 is a side development view showing the allocation of rotary heads of a digital VTR arranged as a third embodiment of the invention.

FIG. 11 is a side development view of the rotary drum of a VTR which is arranged as a third embodiment of the invention. In the case of the third embodiment, the stepped position difference is set at a value $X_1$ between the heads A and B, between the heads B and C and between the heads C and D; at a value X between the heads E and F, between the heads F and G and between the heads G and H; and at a value $X'$ between the heads A and E. The stepped position difference values are thus arranged to enable the heads A, B and C to give the track pitch $T_{P'}$ and other heads to give the track pitch $T_P$ in the normal mode, i.e., when the tape is transported at a tape speed $V_T^*$.

For this purpose, the stepped position difference $X'$ is set at $1.5 \times (T_{P'} - T_P)$. Like in the case of the first embodiment, the track pitch $T_{P'}$ can be expressed, from Formula (3), as follows:

$$T_{P'} = T_P + \left(1 - \frac{1}{n}\right) T_P^* \times \frac{N\theta°}{180°} \quad (15)$$

Meanwhile, there obtains the following relation:

$$8\ T_P^* = 5\ T_P + 3\ T_{P'} \quad (16)$$

Hence, $$\frac{V_T^*}{V_T} = \frac{T_P^*}{T_P} = \frac{8}{8 - 3 \times (1 - 1/n) \times (N\theta°)/180°} \quad (17)$$

Assuming that $N = 4$, $n = 2$ and $\theta = 13.5°$, $$\frac{V_T^*}{V_T} = \frac{160}{151} \approx 1.060 \quad (18)$$

In the case of the long play mode in which the tape is transported at a speed $\frac{1}{2} V_T^*$ with only four heads A, B, C and D intermittently used, the heads give track pitches as follows: the heads A, B and C give the track pitch $T_P$ and the head D a track pitch $(4\ T_P^* - 3\ T_P)$.

The third embodiment is also capable of reducing the increase in the tape using amount down to about 6%.

Next, a VTR arranged as a fourth embodiment of the invention is described as follows: the head arrangement of the VTR is similar to the arrangement shown in FIG. 11. The heads A, B, C and D uniformly give the track pitch $T_P$ when the tape is transported at the speed $\frac{1}{2} V_T$.

In the case of the normal mode in which all the heads are used at the tape speed $V_T^*$ other four heads give the track pitch $T_P$. Using Formula (10), the track pitch $T_{P'}$ obtainable from the heads A, B and C at the tape speed $V_T^*$ can be expressed as follows:

$$T_{P}' = \left(1 - \frac{1}{n} \times \frac{N\theta^\circ}{180^\circ}\right) T_P + T_P^* \frac{N\theta^\circ}{180} \quad (19)$$

Then, like in the case of Formula (16), the average track pitch $T_P^*$ can be expressed as follows:

$$8T_P^* = 5T_P + 3T_P' \quad (20)$$

Hence, in the case of N=4, n=2 and Θ=13.5°, there obtains the following relation:

$$\frac{V_T^*}{V_T} = \frac{T_P^*}{T_P} = \frac{(8n \times 60 - N\theta)}{n(8 \times 60 - N\theta)} \quad (21)$$

$$= \frac{151}{142} \approx 1.0634$$

Therefore, the DVTR of the fourth embodiment is also capable of operating in the long play mode without changing the tape using amount and capable of minimizing the increase in the tape using amount in the normal mode.

Next, referring to FIGS. 12 and 13, the arrangement of the first to fourth embodiments described in the foregoing is as follows:

In the foregoing, the embodiments are described as in the case of N=4, n=2 and Θ=13.5°. However, the invention is also applicable to other numerical combinations. Further, the tape using amount can be suppressed likewise by differentiating the mounting phases of the heads according to this invention in such a case where the stepped head mounting position difference is unvarying like in the cases of FIGS. 1 and 2. In other words, the ratio of tape using amount between the heads to be used in a slow tape speed mode is preferably in an integral ratio. Therefore, it might be difficult to apply the ratio obtained in the foregoing description. In such a case, however, nearly the same advantageous effect is attainable by selecting an integral ratio close to the ratio obtained according to the arrangement described in the foregoing. The possible applications of this invention, therefore, include the above-stated case.

Figure 12:
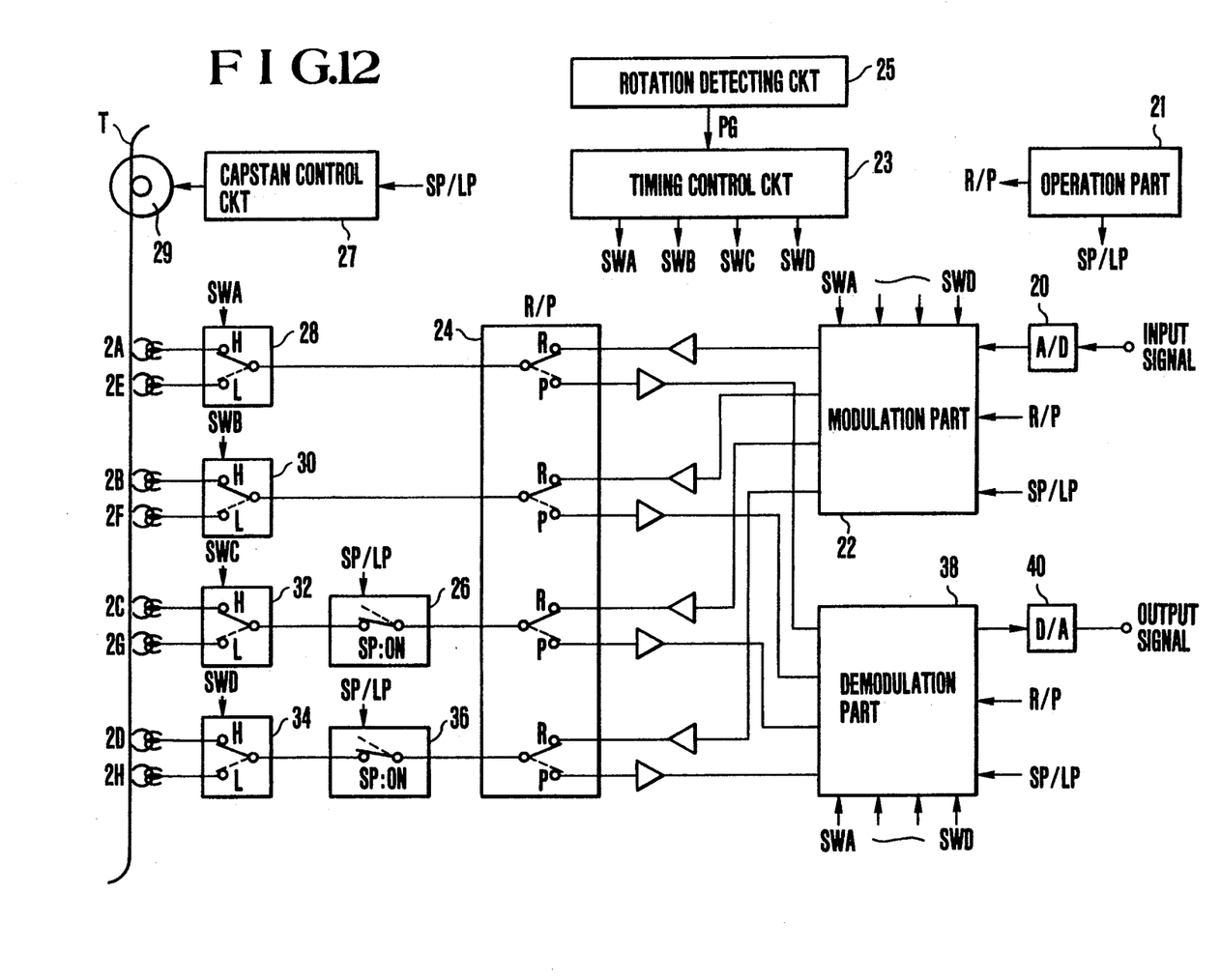
FIG. 12 is a block diagram showing the arrangement of the essential parts of the digital VTR arranged as each of the embodiments of this invention.
Figure 13:
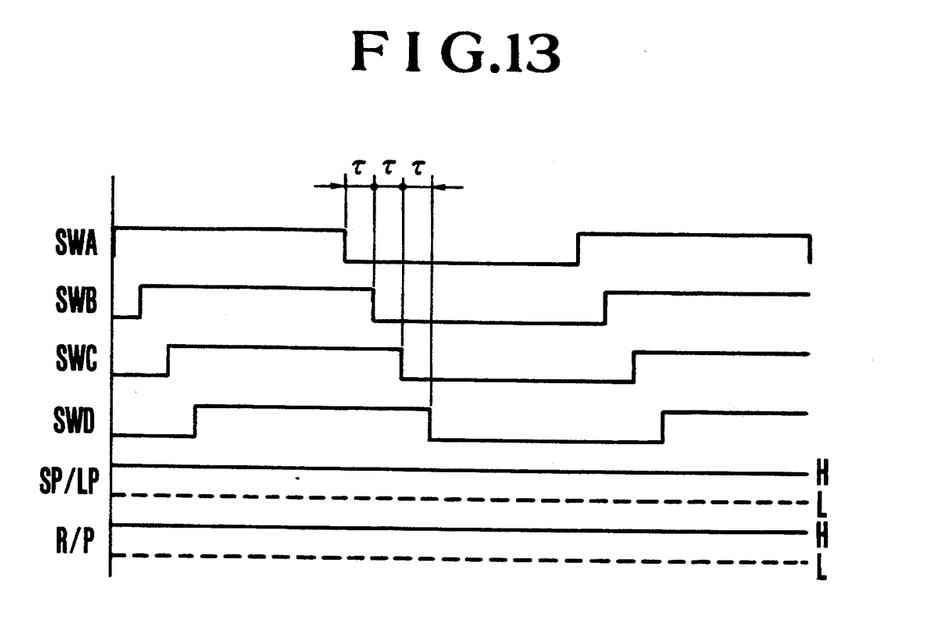
FIG. 13 is a timing chart showing the wave forms of the outputs of the various parts of FIG. 12.

FIG. 12 is a block diagram showing the head switching part of the DVTR to which this invention is applied as the first and second embodiments described. FIG. 13 is a timing chart showing switching signals SWA to SWD, a mode signal SP/LP (short-play/long-play) and a mode signal R/P (recording/reproduction).

The mode signals SP/LP and R/P are binary signals having a high level or a low level according to the manual operation performed on an operation part 21. The switching signals SWA, SWB, SWC and SWD are arranged to be output from a timing control circuit 23 according to a rotation detecting signal PG output from a rotation detecting circuit 25 which is arranged to detect the rotation of a rotary drum having the heads mounted thereon.

Referring to FIG. 12, an input signal is A/D converted by an A/D converter 20. A digital signal thus obtained is supplied to a modulation part 22 to undergo various processes including an encoding process, an error correction code adding process, a DC component suppressing modulation process, etc. After that, the processed signal is converted into parallel signals of four or two channels according to the mode signal SP/LP and are supplied to applicable heads. The operation timing of the arrangement is determined by the switching signals SWA to SWD which are formed according to the phase of the rotary drum as shown in FIG. 13.

The details of the recording operation of the DVTR are as follows: when an instruction is given for the normal recording from the operation part 21, the levels of both the mode signals SP/LP and P/R become high. In response to this, the connecting position of each switch of a switching circuit 24 is shifted to one side R to turn on switches 26 and 36. Switches 28, 30, 32 and 34 shift their connecting positions to one side H when the switching signals SWA, SWB, SWC and SWD are at high levels and to the other side L when these signals are at low levels. Digital signals of four channels output from the modulation part 22 are recorded on a recording medium in a manner as shown in FIG. 6. A capstan control circuit 27 receives the above-stated mode signal SP/LP and controls the rotating speed of a capstan 29 to have a tape T (the recording medium) transported at the above-stated speed $V_T^*$.

In reproducing, the level of the mode signal R/P becomes low. The switching signals SWA, SWB, SWC and SWD shift the connecting positions of the switches 28, 30, 32 and 34 to cause the reproduced signals of four channels to be supplied via the sides P of the switching circuit 24 to a demodulation part 38. The demodulation part 38 performs an error correcting process, a decoding process, etc., on the reproduced signals of four channels and rearrange them into serial data. The serial data thus obtained is supplied to a D/A converter 40 to be output in the form of an analog signal.

In the long play mode, the embodiment operates as follows: In the case of recording in the long play mode, the level of the mode signal SP/LP becomes low while that of the mode signal R/P becomes high. The modulation part 22 supplies output signals of two channels to the switches 28 and 30, The switches 26 and 36 are turned off. The signals of two channels are recorded on the tape T only by the heads 2A, 2B, 2E and 2F. With the mode signal SP/LP being at the low level, the capstan control circuit 27 controls the capstan 29 to transport the tape T either at the speed $\frac{1}{2} V_T^*$ (in the first embodiment) or at the speed $\frac{1}{2} V_T$ (in the second embodiment).

In the case of a reproducing operation in the long play mode, only the reproduced signals output from the switches 28 and 30 are supplied to the demodulation part 38. The demodulation part 38 performs the error correcting process, the decoding process, etc. and converts the reproduced signals into a signal of one channel. The one-channel signal thus obtained is supplied to the D/A converter 40.

Further, in the cases of the third and fourth embodiments, switches which are similar to the switch 26 are provided on common terminal sides of the switches 28 and 30. The four switches including these switches and the switches 26 and 36 are arranged to be constantly on in the normal mode and to be on only when the levels of the switching signals SWA, SWB, SWC and SWD are high in the long play mode. Meanwhile, the modulation part 22 is also arranged to supply digital signals to the switches 28, 30, 32 and 34 only when the switching signals SWA, SWB, SWC and SWD are at high levels in the long play mode.

What is claimed is:

1. A recording apparatus for recording signals by forming many parallel tracks on a tape-shaped recording medium comprising:
   a) transporting means for transporting the tape-shaped recording medium;
   b) an n number of rotary heads arranged to trace the tape-shaped recording medium, transported by said transport means, the n number of rotary heads including a predetermined m number of rotary heads, a distance between positions of adjacent heads included in the predetermined m number of rotary heads in a direction of an axis of rotation of the n number of heads being larger than a distance between positions of other adjacent heads included in the n number of rotary heads, said distance between positions of other adjacent heads being not zero, m being an integer which is at least 2, n being an integer which is larger than m; and
   c) mode selection means for selecting a mode between a plurality of modes which includes, a first mode in which said transporting means transports the tape-shaped recording medium at a first speed in a direction which makes an acute angle with a direction in which the n number of rotary heads rotate and all the n number of rotary heads are recording signals by forming n number of adjacent tracks on the tape-shaped recording medium, and a second mode in which said transporting means transports the tape-shaped recording medium at a second speed which is lower than said first speed in a direction which makes an acute angle with the direction in which the n number of rotary heads rotate and only the predetermined m number of rotary heads are recording signals by forming m number of adjacent tracks on the tape-shaped recording medium.

2. An apparatus according to claim 1, wherein said n number of rotary heads are arranged to rotate at phases close to each other and are disposed in different positions from each other in the direction of the axis of rotation of the n number of heads.

3. An apparatus according to claim 1, wherein said n number of rotary heads comprises of i sets of j number of rotary heads (i and j being an integer which is at least 2), the i sets are disposed at different phases to each other, j number of rotary heads of each set are arranged to rotate close to each other and are disposed in different positions from each other in the direction of the axis of rotation of the n number of heads, and said predetermined m number of rotary heads is a specific one set of said i sets of j number of rotary heads.

4. An apparatus according to claim 1, wherein said first speed is n/m of said second speed.

5. An apparatus according to claim 1, wherein said first speed is faster than n/m of said second speed.

6. A recording apparatus for recording signals by forming many parallel tracks on a tape-shaped recording medium comprising:
   a) transporting means for transporting the tape-shaped recording medium;
   b) an n number of rotary heads arranged to trace the tape-shaped recording medium, transported by said transporting means, the n number of rotary heads including a predetermined m number of rotary heads, m being an integer which is at least 2, n being an integer which is larger than m; and
   c) mode selection means for selecting a mode between a plurality of modes which includes, a first mode in which said transporting means transports the tape-shaped recording medium at a first speed in a direction which makes an acute angle with a direction in which the n number of rotary heads rotate, and all the n number of rotary heads are recording signals by forming n number of adjacent tracks on the tape-shaped recording medium, and a second mode in which said transporting means transports the tape-shaped recording medium at a second speed which is lower than m/n of said first speed in a direction which makes an acute angle with the direction in which the n number of rotary heads rotate and only the predetermined m number of rotary heads are recording signals by forming m number of adjacent tracks on the tape-shaped recording medium.

7. An apparatus according to claim 6, wherein a distance between positions of adjacent heads included in the predetermined m number of rotary heads in a direction of an axis of rotation of the n number of heads is larger than a distance between positions of other adjacent heads included in the n number of rotary heads.

8. An apparatus according to claim 7, wherein said n number of rotary heads are arranged to rotate at phases close to each other and are disposed in different positions from each other in the direction of the axis of rotation of the n number of heads.

9. An apparatus according to claim 7, wherein said n number of rotary heads comprises of i sets of j number of rotary heads, i and j are integers each of which is at least 2, the i sets are disposed at different phases to each other, j number of rotary heads of each set are arranged to rotate close to each other and are disposed in different positions from each other in the direction of the axis of rotation of the n number of heads, and said predetermined m number of rotary heads is a specific one set of said i sets of j number of rotary heads.

10. A reproducing apparatus for reproducing signals from many parallel tracks formed on a tape-shaped reproducing medium comprising:
   a) transporting means for transporting the tape-shaped recording medium;
   b) an n number of rotary heads arranged to trace the tape-shaped recording medium, transported by said transporting means, the n number of rotary heads including a predetermined m number of rotary heads, a distance between positions of adjacent heads included in the predetermined m number of rotary heads in a direction of an axis of rotation of the n number of heads being larger than a distance between positions of other adjacent heads included in the n number of rotary heads, said distance between positions of other adjacent heads being not zero, m being an integer which is at least 2, n being an integer which is larger than m; and
   c) mode selection means for selecting a mode between a plurality of modes which includes, a first mode in which said transporting means transports the tape-shaped recording medium at a first speed in a direction which makes an acute angle with a direction in which the n number of rotary heads rotate and all the n number of rotary heads are reproducing signals by tracing n number of adjacent tracks formed on the tape-shaped recording medium, and a second mode in which said transporting means transports the tape-shaped recording medium at a second speed which is lower than said first speed in a direction which makes an acute angle with the direction in which the n number of rotary heads rotate and only the predetermined m number of rotary heads are reproducing signals by tracing m number of adjacent tracks on the tape-shaped recording medium.

11. An apparatus according to claim 10, wherein said n number of rotary heads are arranged to rotate at phases close to each other and are disposed in different positions from each other in the direction of the axis of rotation of the n number of heads.

12. An apparatus according to claim 10, wherein said n number of rotary heads comprises of i sets of j number of rotary heads (i and j being integers each of which is at least 2), the i sets are disposed at different phases to each other, j number of rotary heads of each set are arranged to rotate close to each other and are disposed in different positions from each other in the direction of the axis of rotation of the n number of heads, and said predetermined m number of rotary heads is a specific one set of said i sets of j number of rotary heads.

13. An apparatus according to claim 10, wherein said first speed is n/m of said second speed.

14. An apparatus according to claim 10, wherein said first speed is faster than n/m of said second speed.

15. A reproducing apparatus for reproducing signals from many parallel tracks formed on a tape-shaped recording medium comprising:
   a) transporting means for transporting the tape-shaped recording medium;
   b) an n number of rotary heads arranged to trace the tape-shaped recording medium, transported by said transporting means, the n number of rotary heads including a predetermined m number of rotary heads, m being an integer which is at least 2, n being an integer which is larger than m; and
   c) mode selection means for selecting a mode between a plurality of modes which includes, a first mode in which said transporting means transports the tape-shaped recording medium at a first speed in a direction which makes an acute angle with a direction in which the n number of rotary heads rotate, and all the n number of rotary heads are reproducing signals by tracing n number of adjacent tracks formed on the tape-shaped recording medium, and a second mode in which said transporting means transports the tape-shaped recording medium at a second speed which is lower than m/n of said first speed in a direction which makes an acute angle with the direction in which the n number of rotary heads rotate and only the predetermined m number of rotary heads are reproducing signals by tracking m number of adjacent tracks on the tape-shaped recording medium.

16. An apparatus according to claim 15, wherein a distance between positions of adjacent heads included in the predetermined m number of rotary heads in a direction of an axis of rotation of the n number of heads is larger than a distance between positions of other adjacent heads included in the n number of rotary heads.

17. An apparatus according to claim 16, wherein said n number of rotary heads are arranged to rotate at phases close to each other and are disposed in different positions from each other in the direction of the axis of rotation of the n number of heads.

18. An apparatus according to claim 16, wherein said n number of rotary heads comprises of i sets of j number of rotary heads, i and j are integers each of which is at least 2, the i sets are disposed at different phases to each other, j number of rotary heads of each set are arranged to rotate close to each other and are disposed in different positions from each other in the direction of the axis of rotation of the n number of heads, and said predetermined m number of rotary heads is a specific one set of said i sets of j number of rotary heads.

* * * * *

UNITED STATES PATENT AND TRADEMARK OFFICE
CERTIFICATE OF CORRECTION

PATENT NO. : 5,359,471
DATED : October 25, 1994
INVENTOR(S) : Masahide Hasegawa It is certified that error appears in the above-identified patent and that said Letters Patent is hereby corrected as shown below:

Col. 2, line 23. Change "$(1-\frac{1}{n}x)$ to -- $(1-\frac{1}{nx})$ --.

Col. 3, line 1. After "Further" insert -- , --.

Col. 5, line 62. Change "$3T_P$ -- (11), there obtains" to -- $3T_P$, there obtains (11) --.

Col. 6, line 9. Change "$\frac{77}{44}$" to -- $\frac{77}{74}$ --.

Col. 6, line 65. After "$V_T*$" insert -- , the --.

Signed and Sealed this

Thirty-first Day of January, 1995

Attest:

BRUCE LEHMAN

*Attesting Officer*   *Commissioner of Patents and Trademarks*